United States Patent
Pavani et al.

(10) Patent No.: US 9,025,877 B2
(45) Date of Patent: May 5, 2015

(54) LOCAL SCALE, ROTATION AND POSITION INVARIANT WORD DETECTION FOR OPTICAL CHARACTER RECOGNITION

(71) Applicants: Sri-Kaushik Pavani, Chennai (IN); Ekta Prashnani, Madhya Pradesh (IN)

(72) Inventors: Sri-Kaushik Pavani, Chennai (IN); Ekta Prashnani, Madhya Pradesh (IN)

(73) Assignee: Ricoh Company, Ltd., Tokyo (JP)

( * ) Notice: Subject to any disclaimer, the term of this patent is extended or adjusted under 35 U.S.C. 154(b) by 199 days.

(21) Appl. No.: 13/734,760

(22) Filed: Jan. 4, 2013

(65) Prior Publication Data

US 2014/0193075 A1    Jul. 10, 2014

(51) Int. Cl.
*G06K 9/18* (2006.01)
*G06K 9/40* (2006.01)
*G06K 9/36* (2006.01)
*G06K 9/32* (2006.01)

(52) U.S. Cl.
CPC  *G06K 9/18* (2013.01); *G06K 9/325* (2013.01); *G06K 9/3283* (2013.01)

(58) Field of Classification Search
None
See application file for complete search history.

(56) References Cited

U.S. PATENT DOCUMENTS

| | | | |
|---|---|---|---|
| 5,764,799 A * | 6/1998 | Hong et al. | 382/225 |
| 6,249,604 B1 * | 6/2001 | Huttenlocher et al. | 382/174 |
| 7,243,305 B2 * | 7/2007 | Schabes et al. | 715/257 |
| 7,580,571 B2 * | 8/2009 | Ohguro | 382/181 |
| 7,873,216 B2 * | 1/2011 | Zandifar et al. | 382/177 |
| 2006/0045379 A1 | 3/2006 | Heaney, Jr. et al. | |
| 2008/0205759 A1 | 8/2008 | Zandifar et al. | |
| 2013/0314753 A1 * | 11/2013 | Brewer et al. | 358/448 |

OTHER PUBLICATIONS

Extended European Search Report for EP Application No. 13 19 9566, dated Jul. 21, 2014; 9 pages.
Vinay Ray Hampapur et al., "Key-word Guided Word Spotting in Printed Text", dated Jun. 1, 2011, 8 pages, EE 368: Image Processing Project Jun. 2011.
Sam S. Tsai et al., "Mobile Visual Search Using Image and Text Features", dated Nov. 6, 2011, 5 pages, IEEE Asilomar 2011.
Huizhong Chen et al., "Robust Text Detection in Natural Images with Edge-Enhanced Maximally Stable Extremal Regions", dated Sep. 11, 2011, 4 pages, 2011 18th IEEE International Conference on Image Processing (ICIP).
Abbyy, Abbyy Lingvo Dictionary Communicate in Different Languages, http://www.abbyy.com, printed Jul. 10, 2014, 1 page.
Ocropus, The OCRopus Open Source Document Analysis and OCR System, https://code.google.com/p/ocropus, printed Jul. 10, 2014, 2 pages.
Tesseract-OCR—An OCR Engine that was developed at HP Labs between 1985 and 1995 . . . and now at Google, https://code.google.com/p/tesseract-ocr/, printed Jul. 10, 2014, 2 pages.

(Continued)

*Primary Examiner* — Daniel Mariam
(74) *Attorney, Agent, or Firm* — Patent Law Works LLP

(57) ABSTRACT

A system and method using a text extraction application for identifying words with multiple orientations from an image are described. The text extraction application receives an input image, generates progressively blurred images, detects blobs in the blurred images, outputs ellipses over the blobs, detects a word in the input image, orients and normalizes a first version of the word, generates an inverted version of the word, performs OCR on the first version and the inverted version of the word, generates confidence scores for the first version and the inverted version of the word and outputs text associated with the word.

20 Claims, 9 Drawing Sheets

(56) References Cited

OTHER PUBLICATIONS

Chen et al, Text Identification in Complex Background Using SVM, 2001, IEEE 2001, 6 pages.

Steve R. Gunn, Support Vector Machines for Classification and Regression, May 10, 1998, 66 pages, University of Southampton.

Keechul Jung et al., Text Information Extraction in Images and Video: a Survey, 2004, pp. 977-997, vol. 37, Pattern Recognition, The Journal of the Pattern Recognition Society, Elsevier Ltd.

Rainer Lienhart et al., Automatic Text Recognition in Digital Videos, Sep. 1998, 9 pages, University of Mannheim, Mannheim, Germany.

Rainer Lienhart et al., Localizing and Segmenting Text in Images and Videos, dated Apr. 2002, pp. 256-268, IEEE Transactions on Circuits and Systems for Video Technology vol. 12, No. 4.

J. Matas et al., Robust Wide Baseline Stereo From Maximally Stable Extremal Regions, Sep. 1, 2004, pp. 761-767, Image and Vision Computing, vol. 22, Issue 10, British Machine Vision Computing 2002, Elsevier.

Lukas Neumann et al., A Method for Text Localization and Recognition in Real-World Images, 2011, pp. 770-783, vol. 6494, Computer Vision—ACCV 2010, Lecture Notes in Computer Science.

U. Pal et al., Multi-Oriented Text Lines Detection and Their Skew Estimation, Dec. 2002, 6 pages, presented at the Proceedings of the Third Indian Conference on Computer Vision, Graphics & Image Processing, Ahmadabad, India.

Michael A. Smith et al., Video Skimming for Quick Browsing Based on Audio and Image Characterization, Jul. 30, 1995, 24 pages, Carnegie Mellon University, Pittsburgh, PA.

Victor Wu et al., TextFinder: An Automatic System to Detect and Recognize Text in Images, Nov. 18, 1997, 36 pages, University of Massachusetts, Amherst, MA.

Cong Yao et al., Detecting Texts of Arbitrary Orientations in Natural Images, Jun. 2012, pp. 1083-1090, IEEE Conference on Computer Vision and Pattern Recognition (CVPR), Providence, RI.

Qixiang Ye et al., Fast and Robust Text Detection in Images and Video Frames, 2005, pp. 565-576, vol. 23, Image and Vision Computing, Elsevier.

Chucai Yi et al., Text String Detection from Natural Scenes by Structure-based Partition and Grouping, 2011, 12 pages, IEEE.

Yu Zhong et al., Automatic Caption Localization in Compressed Video, Apr. 2000, pp. 385-392, vol. 22, No. 4, IEEE Transactions on Pattern Analysis and Machine Intelligence.

\* cited by examiner

LOCAL SCALE, ROTATION AND POSITION INVARIANT WORD DETECTION FOR OPTICAL CHARACTER RECOGNITION

BACKGROUND OF THE INVENTION

1. Field of the Invention

The specification relates to a system and method for performing word detection. In particular, the specification relates to detecting words for optical character recognition (OCR) from an image, invariant to the local scale, rotation and position of the words.

2. Description of the Background Art

There is a gap between printed and electronic media. Software currently exists for bridging the gap by performing OCR on an image to identify text and performing a subsequent action on the identified text. One action includes submitting the identified text to a database to find a matching result. For example, a user can capture an image of an object, for example, with a camera or a smart phone, and send the image to the software. The software identifies the image and provides the user with a website for purchasing the object or learning more information about the object.

Recognizing text from an image is useful because the text not only provides high level semantic information about the content in the image but also can be used to search for related information. However, the recognition of the text is challenging due to distortions of the text in an image. For example, in-plane rotational distortion is rotation along the normal vector that is perpendicular to the plane containing the text. Out-of-plane rotational distortion is rotation along any vector that might introduce perspective deformation of the text. When text in an image has a dominant orientation, the current OCR approaches may work well. But when text with multiple orientations is present in an image, the current OCR approaches expect the text to all be in the same orientation and, as a result, fail to identify text in multiple orientations. For example, an image of a book could include text on the front cover and text along a spine of the book. In another example, the image could include text in both a horizontal direction and text in a vertical direction. As a result the outputs of the current OCR approaches become unreliable.

SUMMARY OF THE INVENTION

The present disclosure overcomes the deficiencies of the prior art with a system for identifying words with multiple orientations in an image. In one embodiment, the system includes a controller, a word detection engine, a word orientation engine and an optical character recognition (OCR) engine. The controller receives an input image. The word detection engine generates progressively blurred images, detects blobs in the blurred images, outputs ellipses based on the blobs and detects a word in the input image. The word orientation engine orients and normalizes the first version of the word and generates an inverted version of the word. The OCR engine performs OCR, generates confidence scores for the first version and the inverted version of the word and outputs text associated with the word that has a higher confidence score.

Other aspects include corresponding methods, systems, apparatuses, and computer program products for these and other innovative aspects.

The system advantageously identifies words with multiple orientations in an image. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
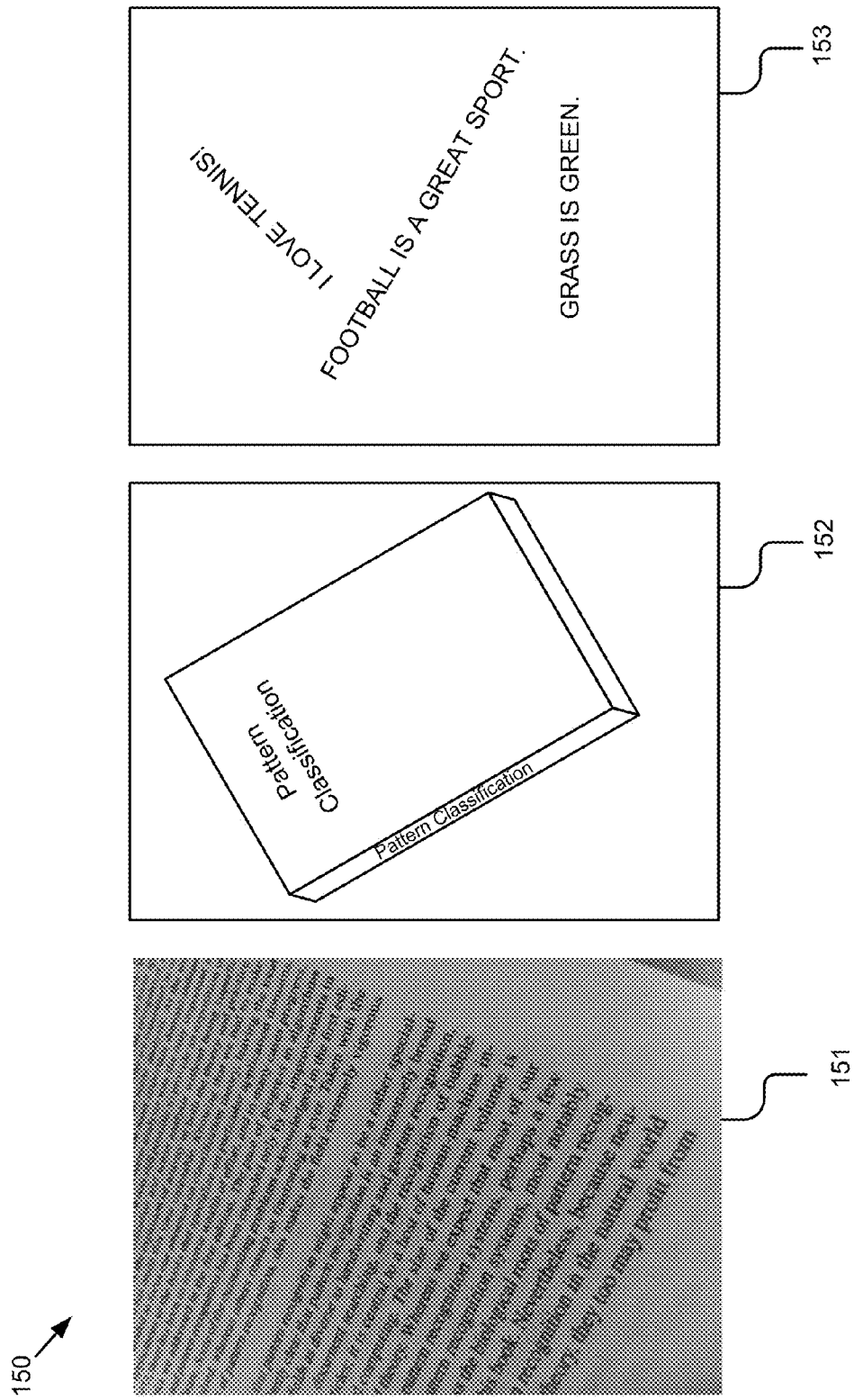
FIG. 1A is a graphic representation of examples of text printed in multiple orientations.

A system and method for identifying words with multiple orientations in an image are described below. FIG. 1A is a graphic representation 150 of text in multiple orientations. Block 151 is an image of an open book where the position of the camera with respect to the page causes the words to be oriented at different angles. For example, the word written at the right-bottom corner has a slightly different orientation to any word near the left-top corner. In this example, the difference in orientation can be up to 15 degrees. Block 152 is an image of a closed book where the text on the front cover has a different orientation than the text on the spine. Block 153 is an image of text where a designer chose to create an image with text in multiple orientations.

In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

Figure 1B:
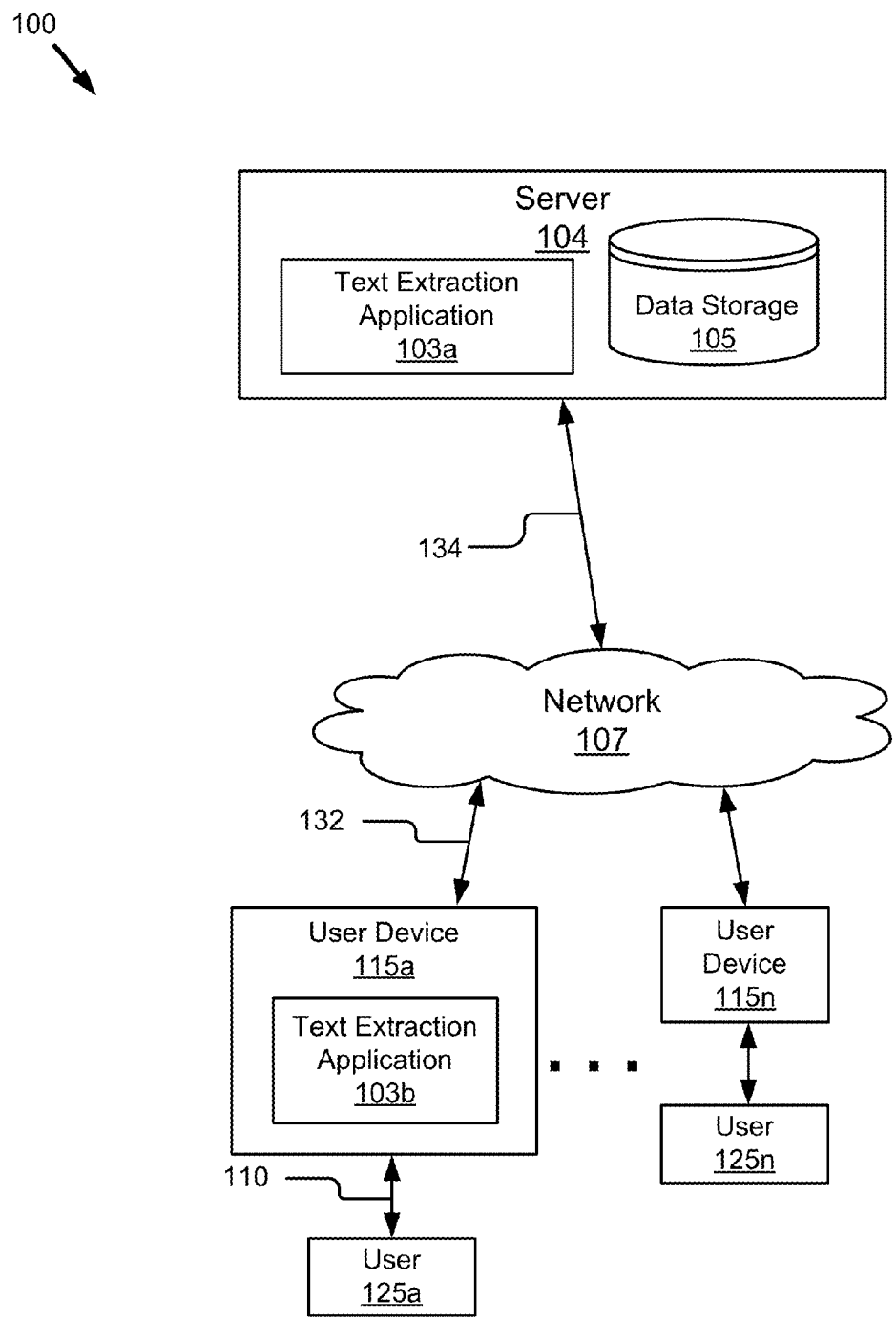
FIG. 1B is a high-level block diagram illustrating one embodiment of a system for identifying words with multiple orientations from an image.

FIG. 1B illustrates a high-level block diagram of a system 100 for identifying words with multiple orientations from an image according to one embodiment. The illustrated embodiment of the system 100 includes user devices 115a-115n that are accessed by users 125a-125n, a server 104 and a network 107. In FIG. 1B and the remaining figures, a letter after a reference number, for example, "115a" is a reference to the element having that particular reference number. A reference number in the text without a following letter, for example "115," is a general reference to any or all instances of the element bearing that reference number.

The server 104 is any computing device including a memory and a processor which is connected to the network 107 via signal line 134. In one embodiment, the server 104 comprises a text extraction application 103a and data storage 105. The text extraction application 103a interacts with the user device 115 to detect words with multiple orientations in an image. For example, the server 104 receives a photo of an orange juice bottle from the user device 115a and determines the name and address of the manufacturer for the orange juice from the product label shown on the photo, where the text associated with the name and address of the manufacturer has text at multiple orientations because the user took the image at an angle that is not horizontal or vertical. The image received by the server 104 can be an image captured by the user device 115, an image copied from a website or an email, or an image from any other source.

In some embodiments, the text extraction application 103a queries a database, for example, the data storage 105 on the server for results that match the words identified by the text extraction application 103. For example, the text extraction application 103a queries a database for webpages (e.g. individual websites or pages within a website, such as a website for selling the item that was captured) that match terms in the identified text. In another embodiment, the text extraction application 103a queries a database for a translation of the words. In yet another embodiment, the text extraction application 103a queries a database for documents that match the text, for example, a database of books, newspapers or scholarly articles that match the identified text. Persons of ordinary skill in the art will recognize that the text extraction application 103a could transmit the identified text to the separate server for performing these additional actions.

The data storage 105 is a non-volatile memory device that stores instructions and/or data used for identifying words with multiple orientations from an image. For example, the data storage 105 includes a user database (not shown) to store input images and words detected from the input images. In some embodiments, the data storage 105 also includes electronic documents and translations of words that are identified by the text extraction application 103. The data storage 105 is communicatively coupled to the text extraction application 103.

The user device 115a is coupled to the network 107 via signal line 132 and the user 125a interacts with the user device 115a via signal line 110. Similarly, the user device 115n is coupled to the network 107 and accessed by the user 125n. The user device 115 is any computing device including a memory, a processor and a communication capability. For example, the user device 115 can be a tablet computer, a personal digital assistant, a smart phone, a feature phone, etc. The user devices 115a-115n can communicate with the network 107 wirelessly or through wired connectivity. The user device 115 includes one or more user applications (not shown) for providing an image to the text extraction application 103. For example, the user device 115 captures an image from a physical object or receives an image.

In one embodiment, the user device 115a includes a text extraction application 103b. In some embodiments, the text extraction application 103 is stored in part on the user device 115 and part on the server 104. For example, the text extraction application 103b on the user device 115a captures an image, transmits the image to the text extraction application 103a on the server 104, receives graphical data related to the image and generates a user interface for display on the user device 115a based on the graphical data. In another embodiment, some of the identification of the text is performed on the text extraction application 103b on the user device 115a and the identified text is transmitted to the text extraction application 103a on the server 104 for performing a subsequent action.

The network 107 is a conventional type, wired or wireless, and has arbitrary number of configurations, for example, as a star configuration, token ring configuration or other configurations known to those skilled in the art. Furthermore, the network 107 includes a local area network (LAN), a wide area network (WAN) (e.g., the Internet), and/or other interconnected data paths across which multiple devices can communicate. In yet other instances, the network 107 is a peer-to-peer network. The network 107 is also coupled to or includes portions of a telecommunications network for sending data in a variety of different communication protocols. In one embodiment, the network 107 includes Bluetooth communication networks or a cellular communications network for sending and receiving data, for example, via short messaging service (SMS), multimedia messaging service (MMS), hypertext transfer protocol (HTTP), direct data connection, WAP, email, etc. While only one network 107 is coupled to the user devices 115a, 115n and the server 104, in practice any number of networks 107 can be connected to the entities.

Example Text Extraction Application 103

Figure 2:
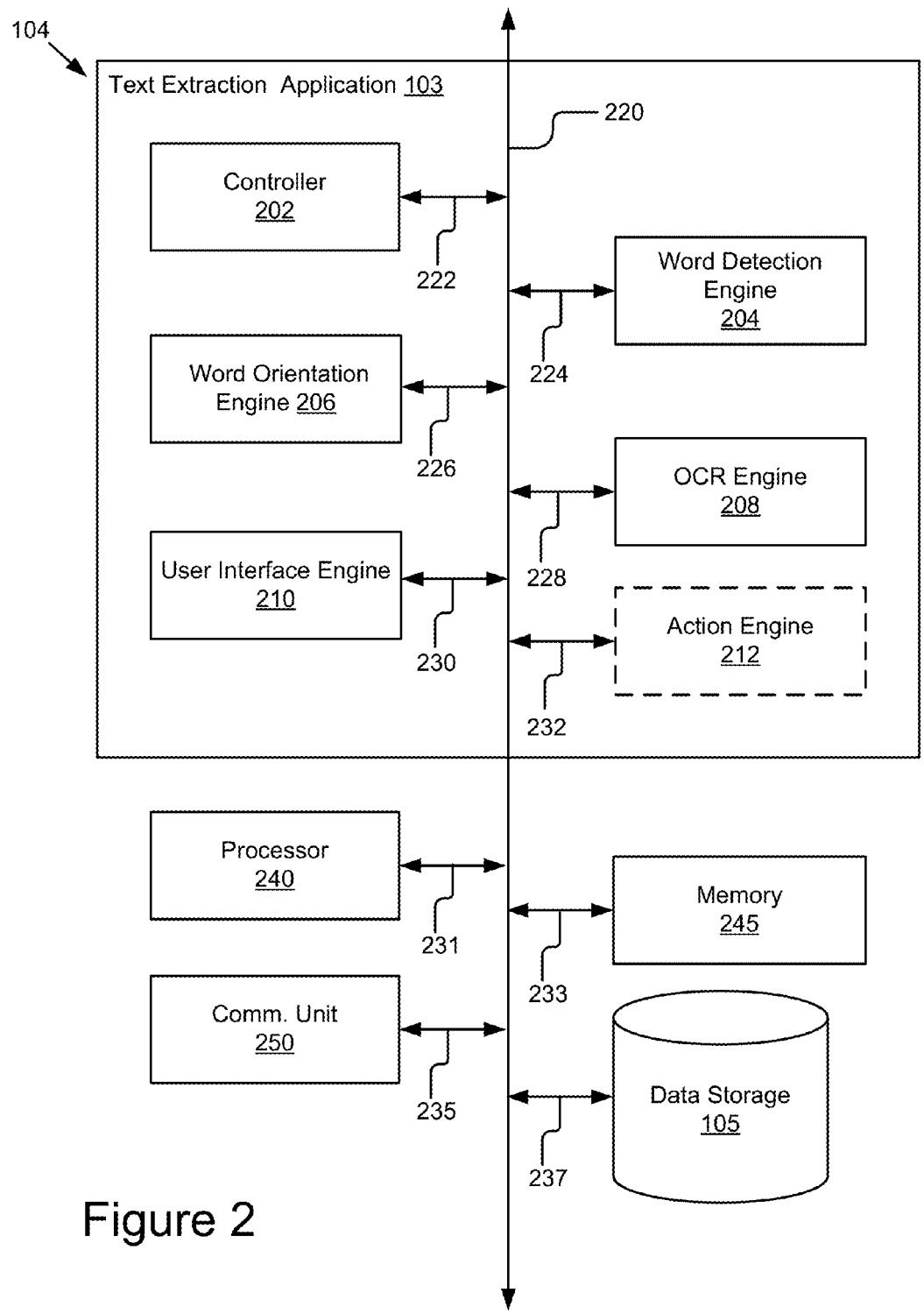
FIG. 2 is a block diagram illustrating one embodiment of a text extraction application.

Referring now to FIG. 2, an example of the text extraction application 103 is shown in more detail. FIG. 2 is a block diagram of a server 104 that includes: a processor 240, a memory 245, a communication unit 250, the text extraction application 103 and the data storage 105.

The processor 240, the memory 245, the communication unit 250, the data storage 105 and the text extraction application 103 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the server 104 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the server 104 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 107 and other processing systems. The communication unit 250 receives data such as images or documents from a plurality of user devices 115a-115n. The communication unit 250 also transmits information to the plurality of user devices 115a-115n. For example, the communication unit 250 transmits graphical data for displaying images or documents. The communication unit 250 is coupled to the bus 220 for communication with the other components of the server 104 via signal line 235.

In one embodiment, the communication unit 250 includes a port for direct physical connection to the user devices 115 or to another communication channel. For example, the communication unit 250 includes an RJ14 or similar port for wired communication with the ESB 107. In another embodiment, the communication unit 250 includes a wireless transceiver for exchanging data with the user devices 115 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, FTP, HTTP, HTTPS and SMTP as will be understood to those skilled in the art.

In one embodiment, the text extraction application includes: a controller 202, a word detection engine 204, a word orientation engine 206, an optical character recognition (OCR) engine 208, a user interface engine 210 and, optionally, an action engine 212. These components of the text extraction application 103 are communicatively coupled to each other via the bus 220.

The controller 202 is software and routines for handling communications between the components of the server 104 and other components of the system 100. In one embodiment, the controller 202 is a set of instructions executable by the processor 240 to provide the functionality described below for receiving data and transmitting the data to an appropriate component. In another embodiment, the controller 202 is stored in the memory 245 of the server 104 and is accessible and executable by the processor 240. In either embodiment, the controller 202 is adapted for cooperation and communication with the processor 240, the communication unit 250 and other components of the server 104 via the signal line 222.

In one embodiment, the controller 202 receives data via the communication unit 250 and transmits the data to the appropriate component of the text extraction application 103. For example, the controller 202 receives a picture taken by a user using a smartphone camera via the communication unit 250 and transmits the picture to the word detection engine 204 for detecting words in the picture. In another embodiment, the controller 202 receives data from a user interface generated by the user interface engine 210 and transmits the data to an appropriate component. For example, the controller 202 receives a selection of a dictionary from a user via a user interface and sends the selection to the OCR engine 208 for comparing text identified from an image to the selected dictionary and adjusting the identified text based on the comparison.

The word detection engine 204 is software and routines for detecting words in an input image. In one embodiment, the word detection engine 204 is a set of instructions executable by the processor 240 to provide the functionality described below for detecting the words in the input image. In another embodiment, the word detection engine 204 is stored in the memory 245 of the server 104 and is accessible and executable by the processor 240. In either embodiment, the word detection engine 204 is adapted for cooperation and communication with the processor 240, the communication unit 250 and other components of the server 104 via the signal line 224.

In one embodiment, the word detection engine 204 receives an image from a user via the controller 202, detects words in the image, outputs a set of ellipses over characters, words, lines, paragraphs and natural image regions to identify potential words, applies word filters to eliminate ellipses that are non-words and retain at least one ellipse for a word in the image, uses Non-Maximal Suppression (NMS) to merge the at least one ellipse for the word to form a single ellipse and outputs the single ellipse as a representative ellipse for the word.

Figure 3A:
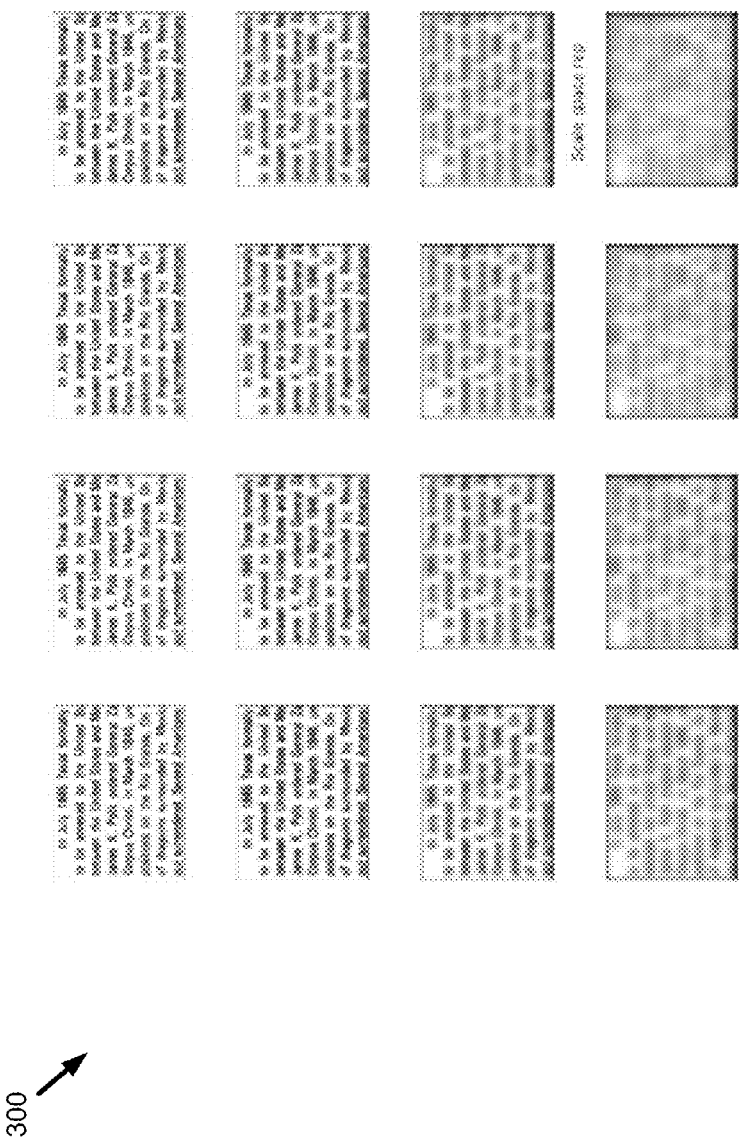
FIG. 3A is a graphic representation of a Gaussian scale space for an image.

In one embodiment, the word detection engine 204 employs Multi-scale Maximally Stable Extremal Regions (MMSER) by using a Gaussian scale space and an MSER algorithm. More specifically, the word detection engine 204 filters an image with a Gaussian filter of a certain variance (referred herein as a "Gaussian scale") to progressively blur the image enough that the words appear as binary large objects (i.e. blobs). FIG. 3A, which is discussed in greater detail below, includes example blurring of an image. The ideal scale for a word to form a blob is a function of its font size and the distance between its characters. Since the ideal scale for the words is not known ahead of time, the word detection engine 204 uses a Gaussian scale space of predefined intervals to determine which filter results in the appropriate blobs.

The word detection engine 204 then employs an algorithm (e.g., a Maximally Stable Extremal Regions (MSER) algorithm) to determine blobs in each image in the Gaussian scale space (i.e. each type of blurred image). MSERs are the parts of the image where local binarization is stable over a large range of thresholds. At lower scales (i.e. less blurred images), the MSER algorithm detects characters, and as the scale increases, words are detected. At the higher end of the scale (i.e. when images are too blurred), the MSER algorithm detects lines and paragraphs.

FIG. 3A is a graphic representation 300 that displays a Gaussian scale space for an input image. The input image is shown in the top-left corner of FIG. 3A. The word detection engine 204 convolves the input image with two-dimensional Gaussian filters of increasing variance (e.g., increasing Gaussian scale) to progressively blur the input image. The word detection engine 204 generates a set of progressively blurred images (e.g., the Gaussian scale space). In FIG. 3A, this is illustrated as the image being progressively blurred through each row from top to bottom and from left to right in each row. Depending on the Gaussian scale used to filter the input image, the MSER algorithm detects characters, words, lines, paragraphs or a natural image region. In the third and fourth rows of FIG. 3A, the detected blobs are represented using a set of ellipses, as described further in reference to FIG. 3B below.

Responsive to detecting and outputting all the image sub-regions (e.g., the set of ellipses over characters, words, lines, paragraphs and natural image regions), the word detection engine 204 determines a representative ellipse for a word from the image sub-regions. There are a couple of reasons for the word detection engine 204 to determine a representative ellipse for a word instead of a representative ellipse for a character or a line or a paragraph. For example, when the word detection engine 204 transmits a word to input to an OCR engine 208, the OCR engine 208 can bypass a page layout analysis algorithm built into the OCR engine 208 that is responsible for decomposing an image that contains single-oriented text (e.g., upright text) within it. The OCR engine 208 can also employ dictionary lookup to the word to improve its accuracy. Furthermore, compared to determining an orientation of a word, it is relatively difficult to determine an orientation of a character, a line or a paragraph. In some cases, the perspective distortion of text images can make every word in a paragraph or a line to be oriented differently and causes problems in determining an orientation of the paragraph or the line. For example, the word detection engine 204 receives a picture of an open book taken by a user using a camera. For this picture, the position of the camera with respect to the book (e.g., the camera being leaned to one side of the book, part of the camera being pressed on the book) causes the words in lines to be oriented at different angles. The words at a first corner of the picture (e.g., the right-bottom corner) can have a slightly different orientation to the words in a second corner (e.g., the left-top corner).

In one embodiment, the word detection engine 204 removes ellipses that are non-words, retains at least one ellipse for a word in the input image and determines a representative ellipse for the word from the at least one ellipse. Examples of non-words include multiple words, lines, paragraphs and natural image regions.

In one embodiment, the word detection engine 204 uses word filters to remove ellipses that are non-words. In one embodiment, the word detection engine 204 computes the aspect ratio of the detected blobs to remove ellipses over non-words. The aspect ratio is a ratio of the width of ellipse blob to the height of the blob. The word detection engine 204 eliminates ellipses with the aspect ratio falling outside a specific interval. For example, the word detection engine 204 removes ellipses over characters and lines by eliminating ellipses that have aspect ratios lower than three or higher than ten (e.g., an ellipse for a character may have an aspect ratio close to one). In another embodiment, the word detection engine 204 performs principal component analysis (PCA) on the coordinates of ellipse pixels for every ellipse in the set of ellipses and removes non-word ellipses based on a PCA result. In one embodiment, the PCA result includes an extent of how much ellipse pixels fit an ellipse. For example, the word detection engine 204 performs PCA on ellipse pixels of an ellipse to obtain at least two principal components. The principal components provide the orientation of the ellipse and its extent in a two-dimensional plane. In one embodiment, the word detection engine 204 determines a threshold of a proportion of the ellipse pixels that are within the boundaries of an ellipse (e.g., 90%) and eliminates ellipses in the set of ellipses whose proportion of pixels within the ellipses is less than the threshold. For example, the word detection engine 204 removes an ellipse if the PCA result of the ellipse shows that 70% of ellipse pixels, which is less than the threshold 90%, are within the boundaries of the ellipse. This way, the word detection engine 204 removes ellipses over multiple words, lines, paragraphs and natural image regions.

Figure 3B:
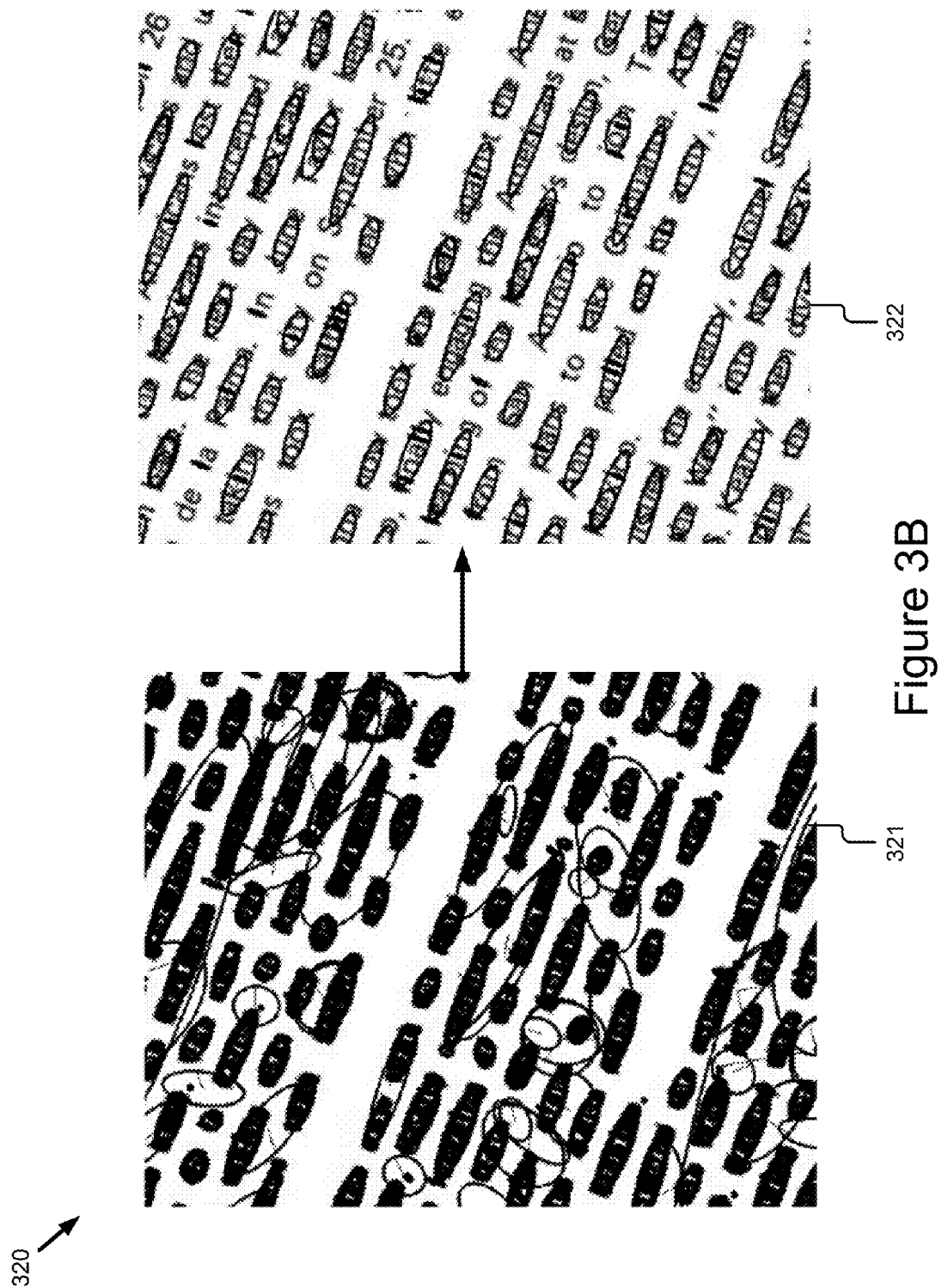
FIG. 3B is a graphic representation of an embodiment of a process for removing ellipses on non-words and generating a representative ellipse for each word.

In one embodiment, after the word detection engine 204 uses word filters to remove ellipses that are non-words the image is left with ellipses for the words. FIG. 3B illustrates a graphical representation 320 of an embodiment of a process for removing ellipses on non-words and generating a representative ellipse for each word. The first box 321 represents ellipses formed over characters, multiple words, natural image regions, etc. The word detection engine 204 determines a representative ellipse for the word from the at least one ellipse. In one embodiment, the word detection engine 204 uses a Non-Maximal Suppression (NMS) algorithm to eliminate duplicate ellipses from the at least one ellipse and to determine a representative ellipse for the word. For example, the word detection engine 204 employs NMS to cluster ellipses that have similar physical dimensions and occupy overlapping areas of an image and to output a representative ellipse for every ellipse cluster. This way, the word detection engine 204 removes duplicate ellipses over a word and outputs a representative ellipse for the word. The second box 322 illustrates a representative ellipse for most words in the image.

In one embodiment, the word detection engine 204 stores the set of ellipses, the representative ellipse for a word and the word in the data storage 105. In another embodiment, the word detection engine 204 also transmits the word and associated representative ellipse to the word orientation engine 206.

The word orientation engine 206 is software and routines for orienting and normalizing a word. In one embodiment, the word orientation engine 206 is a set of instructions executable by the processor 240 to provide the functionality described below for orienting and normalizing the word. In another embodiment, the word orientation engine 206 is stored in the memory 245 of the server 104 and is accessible and executable by the processor 240. In either embodiment, the word orientation engine 206 is adapted for cooperation and communication with the processor 240, the communication unit 250 and other components of the server 104 via the signal line 226.

In one embodiment, the word orientation engine 206 receives a representative ellipse of a word in an image from the word detection engine 204 and determines an orientation of the word based on the representative ellipse. For example, the word orientation engine 206 determines a major axis of the representative ellipse encompassing the word and uses the angle that the major axis of the ellipse makes with the horizontal axis (e.g., the angle measured in the anticlockwise direction from the horizontal) as the orientation of the word.

In one embodiment, the word orientation engine 206 normalizes the orientation of the word responsive to determining the orientation of the word. For example, the word orientation engine 206 rotates the representative ellipse of the word to normalize the orientation of the word to an upright direction. In one embodiment, the word orientation engine 206 normalizes the orientation of the word to obtain two image sub-regions, e.g., a first version of the word and an inverted version of the word. For example, responsive to determining that the angle that the major axis of the representative ellipse of a word makes with the horizontal axis is θ, the word orientation engine 206 rotates the ellipse by −θ and 180−θ to obtain two image sub-regions that correspond to the first version and the inverted version of the word, respectively. The word orientation engine 206 does not know which version is the upright version. The first version and the inverted version of the word are described in more detail below with reference to FIG. 3C.

In one embodiment, the word orientation engine 206 stores the first version and the inverted version of the word in the data storage 105. In another embodiment, the word orientation engine 206 also sends the first version and the inverted version of the word to the OCR engine 208.

The OCR engine 208 is software and routines for performing OCR and outputting the text associated with a word. In one embodiment, the OCR engine 208 is a set of instructions executable by the processor 240 to provide the functionality described below for performing OCR and outputting the text associated with the word. In another embodiment, the OCR engine 208 is stored in the memory 245 of the server 104 and is accessible and executable by the processor 240. In either embodiment, the OCR engine 208 is adapted for cooperation and communication with the processor 240, the communication unit 250 and other components of the server 104 via the signal line 228.

In one embodiment, the OCR engine 208 receives the first version and the inverted version of a word from the word orientation engine 206 and performs OCR on the first version and the inverted version of the word to predict text for the word. In one embodiment, the OCR engine 208 performs OCR on each of the first version and the inverted version of the word to obtain an OCR result for each of the two versions, computes a confidence score for each of the two OCR results and outputs the OCR result that has the higher confidence score. For example, the OCR engine 208 computes a number between zero and one hundred that is indicative of confidence that the OCR engine 208 has in the OCR result of the first version or the inverted version and outputs the OCR result that has a higher number than another as the predicted text of the word. The higher the number (e.g., the confidence score), the higher is the probability that the OCR result correctly predicts the text of the word.

In one embodiment, the OCR engine 208 also compares the text of the word to a dictionary definition and adjusts the text based on the comparison to improve the accuracy of the text prediction. For example, the OCR engine 208 employs dictionary lookup for the text of a word and rectifies OCR errors on individual characters in the text. In one embodiment, the OCR engine 208 receives a selection of a dictionary from a user provided by the controller 202 and uses the selected dictionary for comparing the text of the word.

In one embodiment, the OCR engine 208 outputs the text of the word by displaying the text for a user on a user interface generated by the user interface engine 210. For example, once the text of a word in an image is identified, the OCR engine 208 notifies a user of the word that the user is interested in by displaying both the word and the image on the screen of the user's cell phone. In another embodiment, the OCR engine 208 outputs the text of the word by generating an audio of the text for a user.

In another embodiment, the OCR engine 208 also determines a failure of recognizing the text of a word from an image and notifies a user of the recognition failure. In one embodiment, the OCR engine 208 determines a threshold for confidence scores. If the confidence score associated with an OCR result for a version (the first version or the inverted version) is greater than the threshold and higher than another confidence score, the OCR engine 208 outputs the OCR result as predicted text for the word. Otherwise, the OCR engine 208 notifies a user that the recognition of the word from the image inputted by the user fails and delivers an instruction to the user. For example, responsive to determining a recognition failure, the OCR engine 208 instructs the user to take a new image, send the original image and a comment via different communication means (e.g., via email) or view tips on how to use the system 100.

Figure 3C:
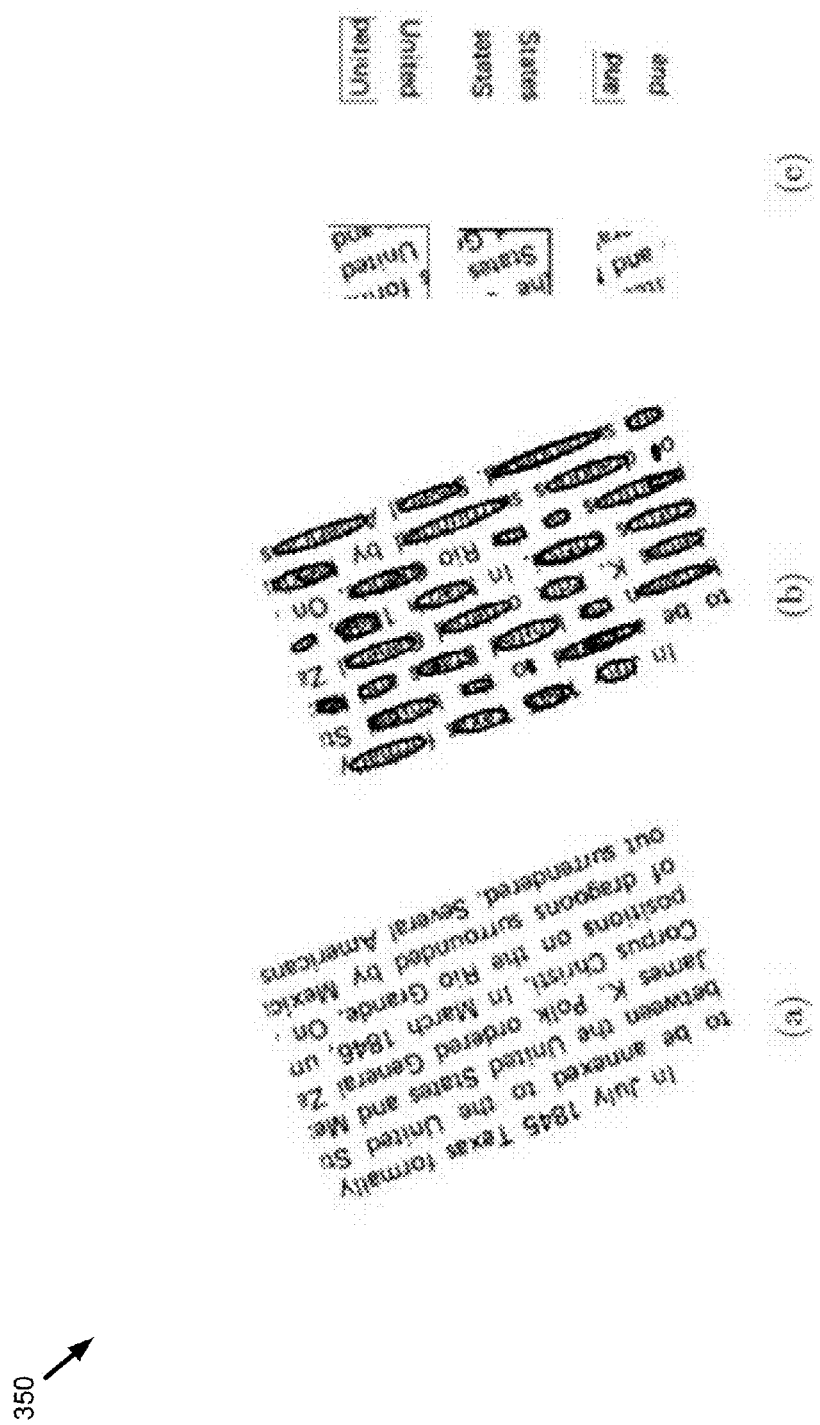
FIG. 3C is a graphic representation of an embodiment of the steps for identifying words with multiple orientations from an image.

FIG. 3C is a graphic representation of an embodiment of the steps performed to identify text in the words. In this example, the user interface 350 depicts steps to identify words from an image invariant to the position, scale and the orientation of the words. Part (a) of FIG. 3C shows an input image with words of text. The controller 202 receives this input image and transmits the input image to the word detection engine 204 for detecting the orientation of the words in the input image. The word detection engine 204 employs an MSER algorithm to detect ellipses in the input image and produces a set of ellipses over characters, words, lines, paragraphs and natural image regions. The word detection engine 204 applies word filters and NMS to the set of ellipses to output a representative ellipse for a word.

Part (b) of FIG. 3C shows words and associated representative ellipses detected by the word detection engine 204. The word orientation engine 206 receives the representative ellipse for a word, determines that the orientation of the word is $\theta$, where $\theta$ is the angle that the major axis of the ellipse makes with the horizontal, and rotates the ellipse by $-\theta$ and $180-\theta$. The word orientation engine 206 obtains two versions of the word by rotating the representative ellipse of the word. The first version of the word includes the word in an upright fashion and the inverted version of the word includes the inverted image of the word.

Part (c) of FIG. 3C shows the first version and the inverted version of words. The left column of part (c) depicts the words detected from the input image. The right column of part (c) depicts the two versions of words. For example, the user interface engine 210 generates graphical data for displaying the first version and the inverted version of words: "United," "States" and "and" from the top to the bottom of the right column of part (c) in FIG. 3C. The word orientation engine 206 sends the first version and the inverted version of the words to the OCR engine 208 to perform OCR and get the text of the words.

The user interface engine 210 is software and routines for generating graphical data for displaying a user interface. In one embodiment, the user interface engine 210 is a set of instructions executable by the processor 240 to provide the functionality described below for generating graphical data for displaying the user interface. In another embodiment, the user interface engine 210 is stored in the memory 245 of the server 104 and is accessible and executable by the processor 240. In either embodiment, the user interface engine 210 is adapted for cooperation and communication with the processor 240, the communication unit 250 and other components of the server 104 via the signal line 230.

In one embodiment, the user interface engine 210 generates graphical data for displaying a user interface to receive a user input. For example, the user interface engine 210 generates a user interface for a user to input an image for identifying words with multiple orientations from the image. In another example, the user interface engine 210 generates a user interface to receive a selection of a dictionary from a user that is used for dictionary lookup. In another embodiment, the user interface engine 210 generates a user interface for displaying text of a word detected from an image. For example, once the text of a word in an image received from a user is identified, the OCR engine 208 sends the word to the user interface engine 210 to include the text in a user interface for displaying to the user.

The action engine 212 is software and routines for performing an action on images with identified text. In one embodiment, the action engine 212 is a set of instructions executable by the processor 240 to provide the functionality described below for performing an action on images with identified text. In another embodiment, the action engine 212 is stored in the memory 245 of the server 104 and is accessible and executable by the processor 240. In either embodiment, the action engine 212 is adapted for cooperation and communication with the processor 240, the communication unit 250 and other components of the server 104 via the signal line 230.

In one embodiment, responsive to outputting the text of a word, the OCR engine 208 also sends the text to the action engine 212 for further processing. In one embodiment, action engine 212 performs an image match to retrieve a document that includes the text by querying the data storage 105 for a match. For example, the OCR engine 208 sends an address of a restaurant recognized from a distorted picture of a magazine to the action engine 212 to retrieve directions for driving to the restaurant.

In another embodiment, the action engine 212 performs translation services. For example, an American student scans an article written in Hindi from a thick book and receives an image that is distorted by pressing the thick book on the scanner. The word detection engine 204 receives the distorted image via the controller 202 and detects the article name on the image. The word orientation engine 206 communicates with the OCR engine 208 to recognize the text of the article name on the image. The OCR engine 208 sends the text to the action engine 212 to translate the text to English such that the student can find the English version of the article. In some embodiments, the action engine 212 is part of a different server.

Methods

Figure 4:
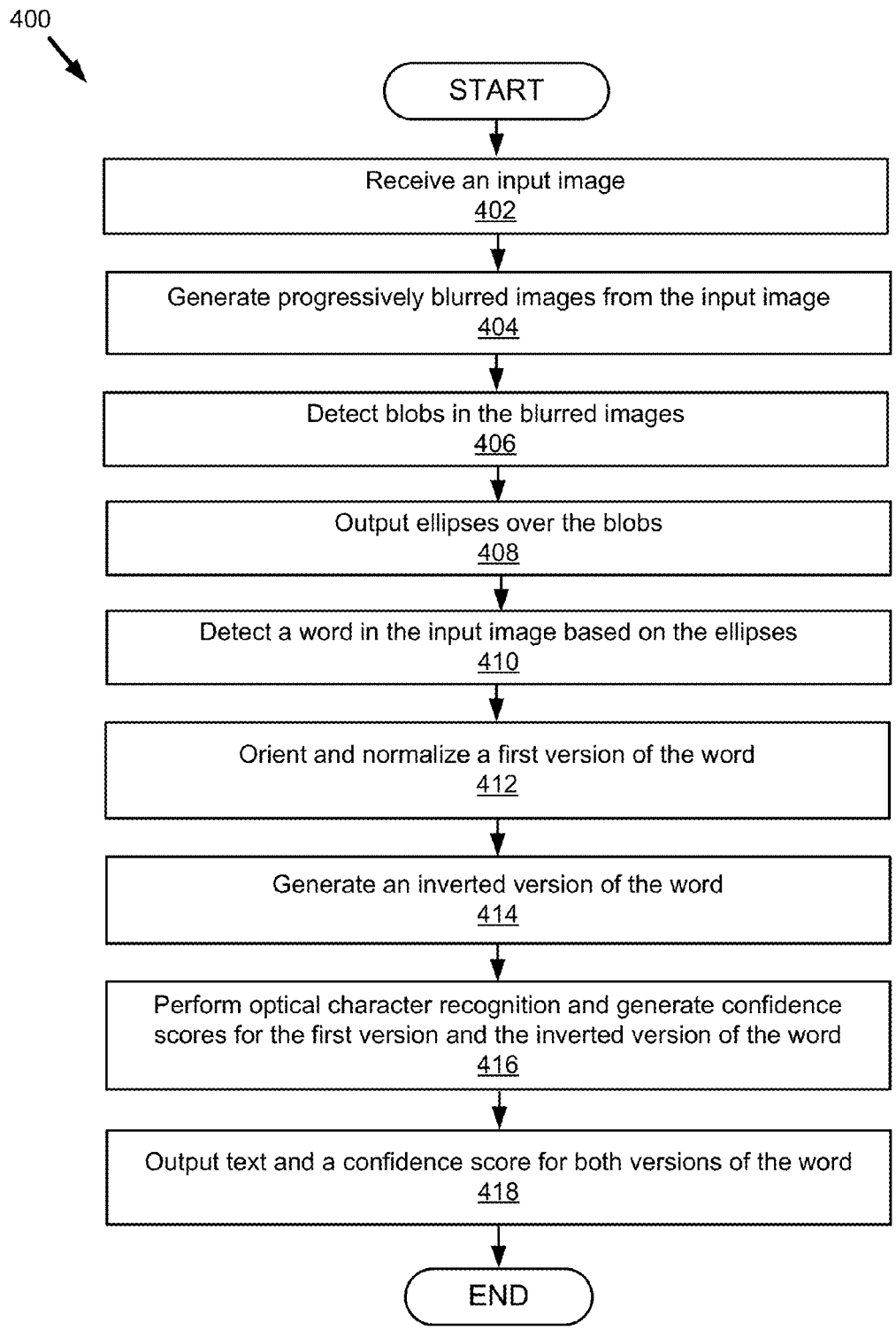
FIG. 4 is a flow diagram of one embodiment of a method for identifying words with multiple orientations from an image.
Figure 5:
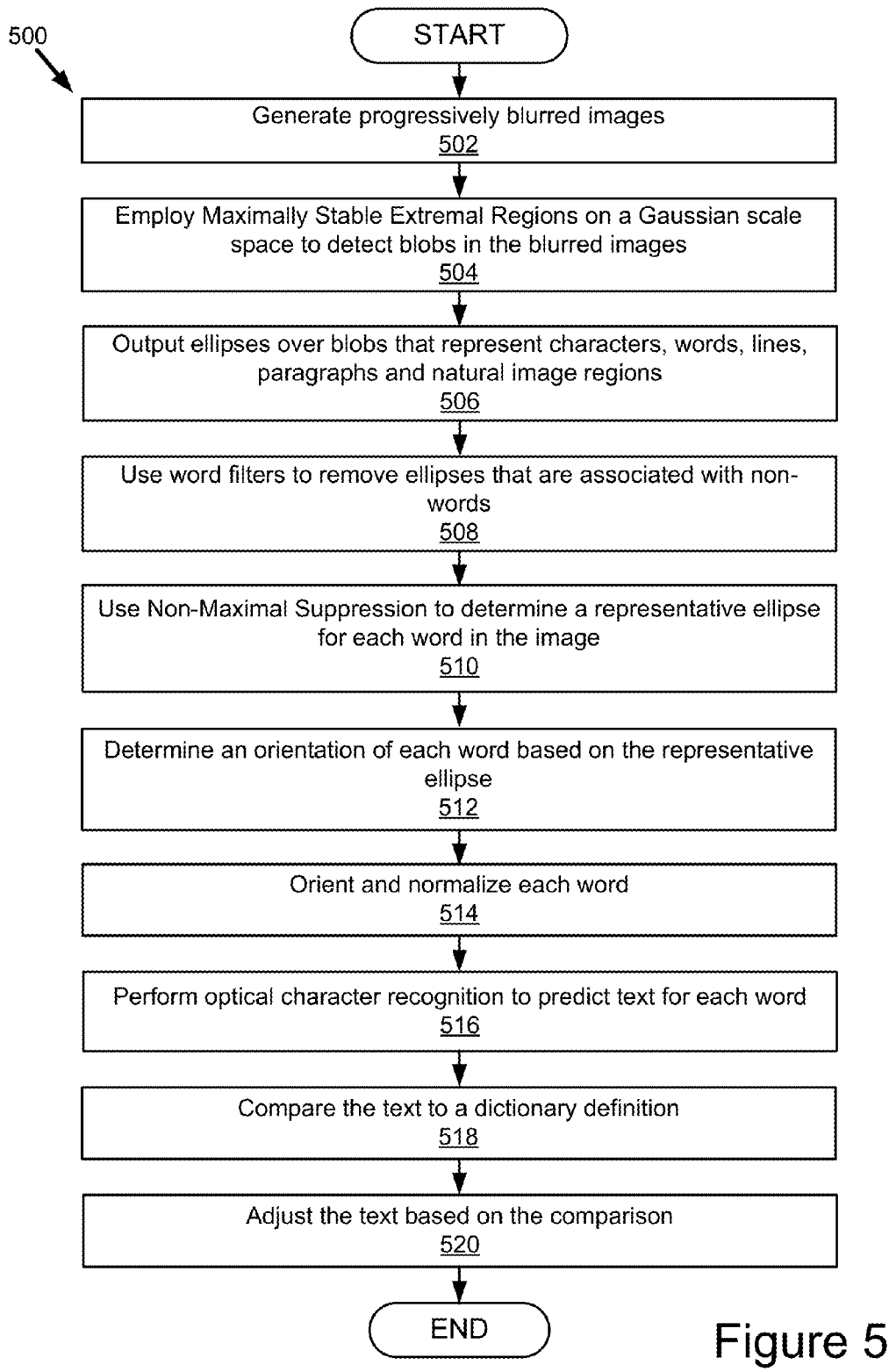
FIG. 5 is a flow diagram of another embodiment of a method for identifying words with multiple orientations from an image.

Referring now to FIGS. 4 and 5, various embodiments of the methods of the invention will be described. FIG. 4 is a flow diagram of one embodiment of a method for identifying words from an image. The text extraction application 103 that implements the steps in FIG. 4 includes a controller 202, a word detection engine 204, a word orientation engine 206 and an OCR engine 208.

The controller 202 receives 402 an input image from a user device 115. For example, a user 125 takes a picture of a textbook. The controller 202 transmits the input image to the word detection engine 204, which generates 404 progressively blurred images from the input image. The word detection engine 204 detects 406 blobs in the blurred images, outputs 408 ellipses over the blobs and detects 410 a word in the input image based on the ellipses.

The word detection engine 204 transmits the input image with the detected word to the word orientation engine 206, which orients 412 and normalizes a first version of the word. The word orientation engine 206 generates 414 an inverted version of the word and transmits the two versions of the word to the OCR engine 208. The OCR engine performs 416 optical character recognition and generates confidence scores for the first version and the inverted version of the word. The OCR engine 208 outputs text and a confidence score for both versions of the word. The OCR engine 208 selects the version that produced a higher score. The OCR engine 208 repeats this process for all words in the image. In some embodiments, the OCR engine 208 determines whether the first version or the inverted version applies to the remaining words in the image and performs OCR on the selected configuration.

FIG. 5 is a flow diagram of another embodiment of a method for identifying words with multiple orientations from an image. The text extraction application 103 that implements the steps in FIG. 5 includes a controller 202, a word detection engine 204, a word orientation engine 206 and an OCR engine 208.

The controller 202 receives an image from a user device 115. The controller 202 transmits the image to the word detection engine 204, which filters the image to generate 502 progressively blurred images and employs 504 maximally stable extremal regions on a Gaussian scale space to detect blobs in the blurred image. The word detection engine 204 outputs 506 ellipses over blobs that represent characters, words, lines, paragraphs and natural image regions. The word detection engine 204 uses 508 word filters to remove ellipses that are associated with non-words. The word detection engine 204 uses 510 non-maximal suppression to determine a representative ellipse for each word in the image.

The word detection engine transmits the image with representative ellipses to the word orientation engine 206, which determines 512 an orientation of each word based on the representative ellipse. The word orientation engine 206 orients and normalizes 514 each word. For example, the word orientation engine 206 determines a major axis of the representative ellipse encompassing the word and uses the angle that the major axis of the ellipse makes with the horizontal axis as the orientation of the word.

The word orientation engine 206 transmits the normalized words to the OCR engine 208, which performs 516 optical character recognition to predict text for each word in the image. In some embodiments, the OCR engine 208 generates an inverted version of each word, performs optical character recognition and generates confidence scores for each version to determine which has a higher confidence score. The OCR engine 208 compares 518 the text to a dictionary definition to confirm that the characters were accurately identified. The OCR engine 208 adjusts 520 the text based on the comparison. For example, if the OCR engine 208 identifies a word as "electranic" and the dictionary identifies the word as "electronic," the OCR engine 208 replaces the "a" with an "e."

Example User Interface

Figure 6:
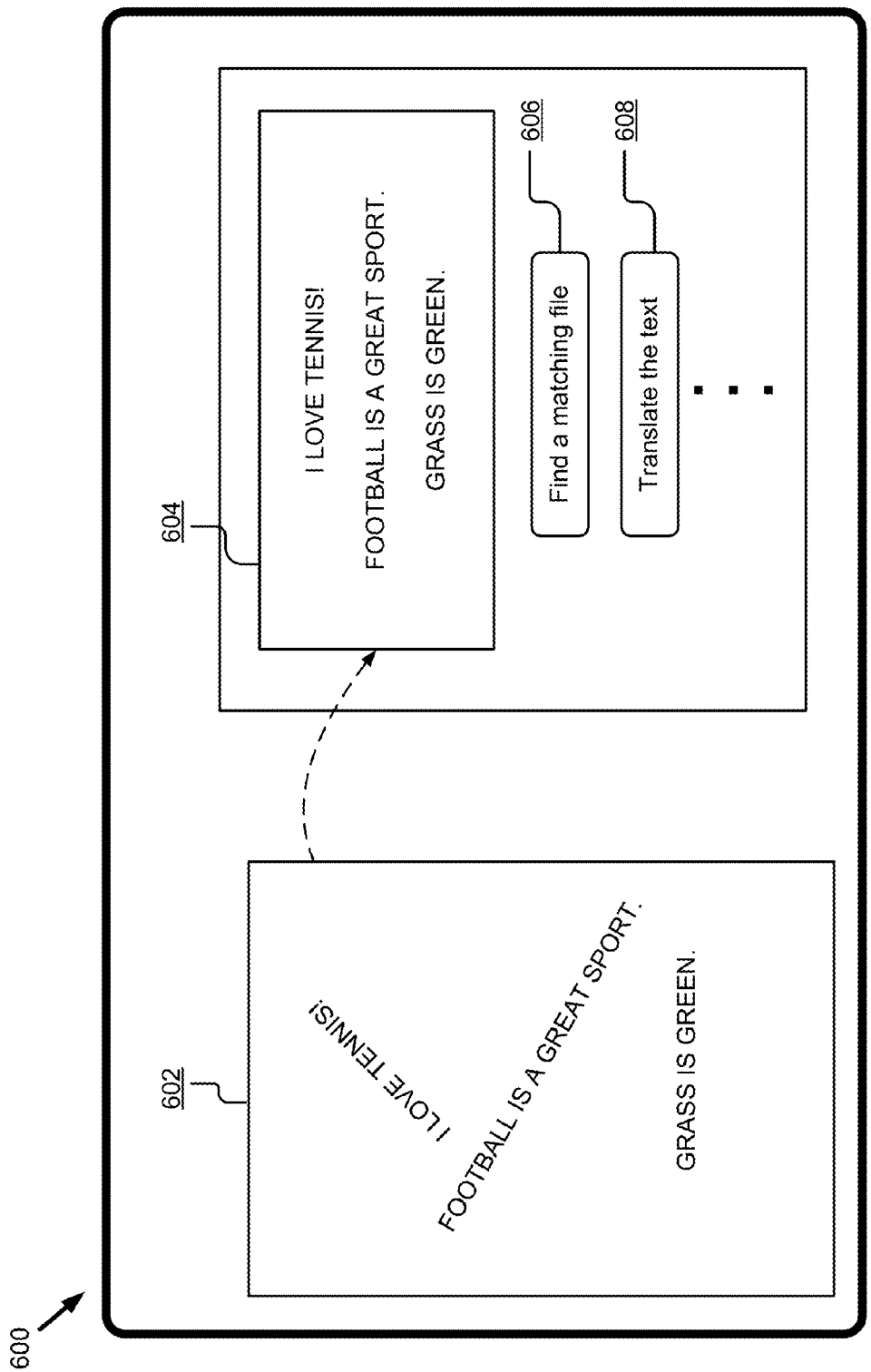
FIG. 6 is a graphic representation of an embodiment of a user interface that displays text associated with words that is identified from an image.

FIG. 6 is a graphic representation of an example user interface 600 generated by the user interface engine 210. In this example, the user interface 600 displays text for words identified from an image. The text extraction application 103 receives an image 602 shown in the left side of the user interface 600. The image 602 includes three lines of words. Each line has a different orientation from the other lines. For example, the first angle that the first line makes with the horizontal axis (e.g., anticlockwise from the horizontal) is less than 90 degree, the second angle that the second line makes with the horizontal axis is greater than 90 degree and the third angle that the third line makes with the horizontal axis is close to zero degree. The text extraction application 103 detects each word in the lines, orients and normalizes the words and performs optical character recognition on the words to output text associated with the words in 604. The optical character recognition result, e.g., the text 604 associated with each word, includes "I LOVE TENNIS" in the first line, "FOOTBALL IS A GREAT SPORT" in the second line and "GRASS IS GREEN" in the third line.

Once the text extraction application 103 recognizes the text 604, the action engine 212 can perform addition processing of the text 604. For example, a user can click on the button 606 to cause the action engine 212 to find a match file that includes the text 604. The user can also click on the button 608 to trigger the action engine 212 to translate the text 604.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving an input image;
generating progressively blurred images from the input image, by filtering the input image with different scales, until words in a blurred image appear as blobs;
detecting the blobs in the blurred image;
outputting ellipses over the blobs;
detecting, using one or more computing devices, a word in the input image based on the ellipses;
determining an orientation of the word;
normalizing, using the one or more computing devices, the orientation of the word;
performing optical character recognition on the word; and
outputting, using the one or more computing devices, text associated with the word.

2. The method of claim 1, further comprising:
generating a first version of the word and an inverted version of the word;
generating a confidence score for each of the first version of the word and the inverted version of the word; and
wherein the text is associated with one of the first version or the inverted version of the word that has a higher confidence score.

3. The method of claim 1, further comprising determining a representative ellipse for the word.

4. The method of claim 3, wherein determining the representative ellipse for the word comprises:
removing ellipses that are non-words using word filters;
retaining at least one ellipse for the word in the input image; and
determining the representative ellipse for the word based on an aspect ratio of the at least one ellipse.

5. The method of claim 1, further comprising:
comparing the text associated with the word to a dictionary definition; and
adjusting the text based on the comparison.

6. The method of claim 1, wherein normalizing the orientation of the word comprises
normalizing the word to an upright orientation.

7. The method of claim 1, further comprising outputting the text associated with the word for performing an image match and retrieving a document that includes the text.

8. The method of claim 1, further comprising outputting the text associated with the word for performing translation on the text.

9. A system comprising:
one or more processors;
a controller stored on a memory and executable by the one or more processors, the controller configured to receive an input image;
a word detection engine configured to generate progressively blurred images from the input image, by filtering the input image with different scales, until words in a blurred image appear as blobs, to detect the blobs in the blurred image, to output ellipses over the blobs and to detect a word in the input image based on the ellipses;
a word orientation engine configured to determine an orientation of the word and to normalize the orientation of the word; and
an optical character recognition (OCR) engine configured to perform optical character recognition on the word and output text associated with the word.

10. The system of claim 9, wherein the word orientation engine is further configured to:
generate a first version of the word and an inverted version of the word;
generate a confidence score for each of the first version of the word and the inverted version of the word; and
wherein the text is associated with one of the first version or the inverted version of the word that has a higher confidence score.

11. The system of claim 9, wherein the word detection engine is further configured to determine a representative ellipse for the word.

12. The system of claim 11, wherein determining the representative ellipse for the word comprises:
removing ellipses that are non-words using word filters;
retaining at least one ellipse for the word in the input image; and
determining the representative ellipse for the word based on an aspect ratio of the at least one ellipse.

13. The system of claim 9, wherein the OCR engine is further configured to:
compare the text associated with the word to a dictionary definition; and
adjust the text based on the comparison.

14. The system of claim 9, wherein normalizing the orientation of the word comprises
normalizing the word to an upright orientation.

15. A computer program product comprising a non-transitory computer useable medium including a computer readable program, wherein the computer readable program when executed on a computer causes the computer to:
receive an input image;
generate progressively blurred images from the input image, by filtering the input image with different scales, until words in a blurred image appear as blobs;
detect the blobs in the blurred image;
output ellipses over the blobs;
detect a word in the input image based on the ellipses;
determine an orientation of the word;
normalize the orientation of the word;
perform optical character recognition on the word; and
output text associated with the word.

16. The computer program product of claim 15, further comprising:
generating a first version of the word and an inverted version of the word;
generating a confidence score for each of the first version of the word and the inverted version of the word; and
wherein the text is associated with one of the first version or the inverted version of the word that has a higher confidence score.

17. The computer program product of claim 16, further comprising determining a representative ellipse for the word.

18. The computer program product of claim 17, wherein determining the representative ellipse for the word comprises:
removing ellipses that are non-words using word filters;
retaining at least one ellipse for the word in the input image; and
determining the representative ellipse for the word based on an aspect ratio of the at least one ellipse.

19. The computer program product of claim 15, wherein the computer readable program when executed on the computer further causes the computer to:
compare the text associated with the word to a dictionary definition; and
adjust the text based on the comparison.

20. The computer program product of claim 15, wherein normalizing the orientation of the word comprises normalizing the word to an upright orientation.

* * * * *